July 29, 1952  F. G. MILLER ET AL  2,605,338
COURTESY LIGHT
Filed Jan. 6, 1950
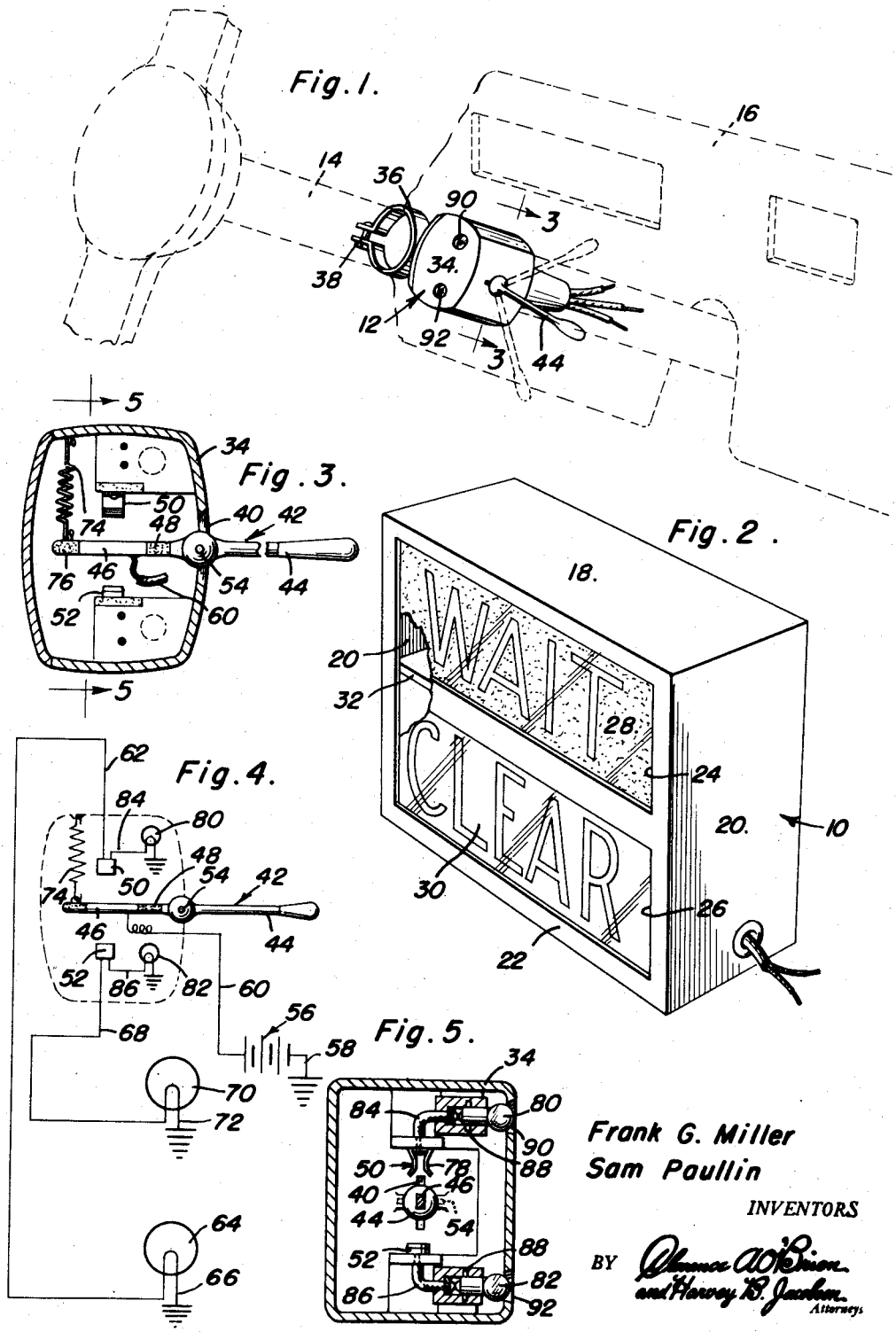
Frank G. Miller
Sam Paullin
INVENTORS Patented July 29, 1952

2,605,338

UNITED STATES PATENT OFFICE 2,605,338

COURTESY LIGHT

Frank G. Miller and Sam Paullin,
Mount Sterling, Ohio

Application January 6, 1950, Serial No. 137,168

1 Claim. (Cl. 177—339)

This invention comprises novel and useful improvements in indicator lights for automobiles, and more particularly pertains to an indicator light whereby the driver of one vehicle can signal to the driver of the vehicle behind whether or not it is safe to pass.

An important object of this invention is to provide a signalling device whereby the driver of one vehicle can readily and easily indicate to the driver of vehicle behind, which latter driver is desirous of passing the former, whether or not it is safe to pass.

Another object of this invention is to provide an indicator signal which is so controlled that it requires a positive act of the operator to indicate to the driver of a vehicle behind that the road conditions are such that it is safe to pass whereby inadvertent signalling that it is safe to pass is prevented.

A further feature of this invention is to provide a driving signal which is of simple construction yet durable and highly efficient for the purposes intended.

An important feature of this invention resides in the provision for an indicator light having a "pass" and "no pass" unit therein with means for selectively energizing each of said units.

Another feature of this invention resides in the provision for an actuator for said "pass" and "no pass" unit, which actuator requires a positive act of the operator to illuminate and retain illuminated the pass unit.

A further feature of this invention resides in the provision for means responsive to the energization of the "pass" and "no pass" units to indicate which of the units is illuminated.

These, together with various ancillary features and objects are attained by this device, a preferred embodiment of which has been illustrated by way of example only in the accompanying drawings, wherein:

Figure 1 is a perspective view of the indicator light switch, shown attached to the steering post of an automobile.

Figure 2 is a perspective view of the indicator light.

Figure 3 is a transverse sectional view of the indicator light switch, taken substantially on the plane 3—3 of Figure 1.

Figure 4 is a schematic diagram illustrating the electrical circuit in this invention.

Figure 5 is a longitudinal sectional view taken substantially on the plane 5—5 of Figure 3.

Due to the inability of the operator of a passing auto to see the road conditions in front of the vehicle which he is passing, at least until the passing auto has positioned itself partially within the lane of the opposing traffic, the passing of vehicles on the highway is made extremely hazardous. As the driver of the vehicle ahead, which may well be a bus or a truck or the like, is in a much better position to know whether or not the car behind should pass it, since the forward vehicle can see clearly both the approaching traffic, and other dangerous spots for passing such as hills and curves and the like, the applicant has devised a signalling system whereby the driver of the forward vehicle can indicate to the vehicle behind whether or not the road ahead is clear for passing. As there would obviously be more of a hazard than a safety measure to have a device in which the operator of one vehicle could inadvertently indicate to the vehicle behind that it was clear to pass, thereby introducing a false sense of security into the passing vehicle so that the latter would not even approach at its customary caution, the indicating system was so constructed that a positive act of the operator is required to indicate that the road ahead is clear for passing.

Referring now more specifically to the accompanying drawings wherein like numerals designate similar parts throughout the various views, it can be readily seen that there is provided an indicating light designated generally by the numeral 10, which light is adapted to be attached preferably to the rear of a vehicle, and which indicator light is controlled by a switch designated generally by the numeral 12, which switch may be conveniently attached to the steering post 14 of an automobile 16.

The indicator light 10 consists generally of a casing having top and side walls 18 and 20, respectively, and a front wall 22. The front wall 22 is preferably provided with longitudinal apertures 24 and 26. The apertures 24 and 26 are panelled with transparent or translucent panes 28 and 30, respectively, one of the panes, such as 28 having the word "WAIT" or words of similar import thereon, the pane 30 having the word "CLEAR." As is conventional, the words "WAIT" and "CLEAR" may either be cut from a stencil attached to the panes 28 and 30, respectively, or they may be formed in other desired manner in which these words would become visible upon illumination from within the casing. For reasons which will later become apparent, it is intended that the pane 28, upon which the word "WAIT" is imprinted, shall be of a color such as red or yellow which would signify danger, and that the pane 30 upon which the word "CLEAR" is imprinted shall be of a color such as green or other color which would signify that it is safe to pass. An opaque plate 32 is attached to the side walls 20 of the casing in such a manner as to divide the casing longitudinally into two compartments, so that light introduced into one of the compartments will not illuminate the other.

The switch 12 consists generally of a casing 34, which casing is attached to the steering post 14 of an automobile, or the like, as by the bifurcated bracket 36 which is attached intermediate its ends to the casing, and is locked to the steering post, as by the bolt and nut 38. Pivotally attached to the casing, and extending through a recess 40 therein, is a switch lever 42, which switch lever includes a handle 44 and a contact arm 46 which is secured to the handle by the non-conducting connector 48. Contact points 50 and 52 are secured to the casing 34 in any desired manner, and extend into the path of movement of the contact arm 46, as the latter is pivoted about the pivot pin 54.

A source of current, indicated generally by the numeral 56, and having one side connected to ground, as by the conductor 58, is connected as by the conductor 60 to the contact arm 46. The contact point 50 is connected as by the conductor 62 to a light 64, the other terminal of which light is connected to the ground as by conductor 66. Similarly, the contact point 52 is connected as by the conductor 68 to a light bulb 70, the other lead of which light is connected to the ground as by the conductor 72. As will be readily understood from a consideration of Figure 4, pivoting of the contact arm 46 about the pivot pin 54 will cause the contact arm to be selectively engaged with either the contact point 50 or the contact point 52, in which case either one or the other of the light bulbs 70 or 64 will be illuminated.

As previously stated, it is intended that a positive act of the operator be required to illuminate that signal which would indicate to the driver in the car following that it is safe to pass. Accordingly, the applicant has provided a spring 74, which spring is attached to the contact arm 46 through the medium of the insulating block 76, the other end of the spring 74 being connected to the casing 34 in any desired manner. Assuming that the light 70 is positioned in the light casing 10, behind the transparent pane 30, upon which the word "CLEAR" is imprinted, then the spring 74 is attached to the casing on the side which is opposite to the side of the control arm 46 on which the contact point 52 is secured, so as to yieldingly urge the contact arm in a direction away from the contact point 52. This positioning of the spring will not interfere with the retention of the contact arm 46 in engagement with the contact point 50, so that the light 64 which is connected to the contact point 52 may be retained in an illuminated condition without the necessity of applying operating pressure to retain the contact arm 46 in engagement with the contact point 50. In keeping with this construction, the contact point 50 may well be formed so as to have resilient fingers 78 which will frictionally embrace the contact arm 46 when the latter is swung into engagement therewith. Thus, there is provided a switching mechanism whereby the "WAIT" signal, which is illuminated by the light 64, may be retained in an illuminated condition without the necessity of a retaining pressure being applied by the operator of the vehicle so that, under certain traffic conditions, such as when a plurality of cars are approaching from the opposite direction, the operator of the forward vehicle can indicate to the driver behind the condition of the road for passing, and yet have both hands free to manipulate his vehicle.

In the event that it is desired to require a positive act of the operator to energize either signal, the spring 74 may well be attached to the casing 34 at a point which lies in the same longitudinal plane as does the contact arm 46 when the latter is in its neutral position. Thus, the spring 74 will yieldingly bias the contact arm 46 out of engagement with either the contact points 50 or 52.

In order to indicate to the driver which of the signalling units is energized, there may be provided indicator lights 80 and 82, which indicator lights are connected by suitable conductors 84 and 86, respectively, to the contact points 50 and 52. These lights are attached, as by brackets 88, to the casing 34, so that the lights 80 and 82 are aligned respectively with apertures 90 and 92 in the upper surface of the casing. These apertures may be panelled with a suitable transparent pane, these panes being suitably colored so that the pane 90 corresponds to the color of the transparent pane 28 of the indicating light, and the pane 92 corresponds with the color of the transparent pane 30, or, alternatively, the lights 80 and 82 may themselves be correspondingly colored. Accordingly, as the contact arm makes connection with either contact point 50 or 52, both the signal light and the corresponding indicator light will be illuminated.

From the foregoing, it is thought that the operation and construction of the device will be readily understood, and further discussion is believed to be unnecessary. However, since numerous modifications will readily occur to those skilled in the art after a consideration of the foregoing specification and accompanying drawings, it is not desired to limit the invention to that shown and described, but all suitable modifications may be resorted to falling within the scope of the appended claim.

Having described the invention, what is claimed as new is:

A driving signal for vehicles comprising an indicator light having a pass and no-pass unit therein, means selectively energizing said units, said means including a casing, a switch lever pivotally attached to said casing for movement in a horizontal plane, a first and second contact arm secured to said lever, contact terminals mounted on said casing on opposite sides of said contact arm so as to be selectively engageable thereby, conductors connecting said first contact terminal to said "CLEAR" unit and said second contact terminal to said "WAIT" unit, means connecting said contact arm to said source of current, a spring attached to said contact arm and to said casing to yieldingly urge said arm out of engagement with said first contact terminal, said second contact terminal being so constructed and arranged to releasably retain said arm in electrical contact therewith.

FRANK G. MILLER.
SAM PAULLIN.

REFERENCES CITED

The following references are of record in the file of this patent:

UNITED STATES PATENTS

| Number | Name | Date |
|---|---|---|
| 2,044,300 | Heans | Jan. 16, 1936 |
| 2,088,370 | Gingras | July 27, 1937 |
| 2,464,535 | Smith, Jr. | Mar. 15, 1949 |
| 2,503,336 | Hines | Apr. 11, 1950 |
| 2,517,173 | Blasingame | Aug. 1, 1950 |